(12) United States Patent
Dong et al.

(10) Patent No.: US 10,275,359 B2
(45) Date of Patent: Apr. 30, 2019

(54) CACHE CLEANING METHOD AND APPARATUS, CLIENT

(71) Applicant: SHELL INTERNET (BEIJING) SECURITY TECHNOLOGY CO., LTD., Beijing (CN)

(72) Inventors: Yi Dong, Beijing (CN); Hang Wei, Beijing (CN); Dingpan Li, Beijing (CN); Jian Ma, Beijing (CN)

(73) Assignee: SHELL INTERNET (BEIJING) SECURITY TECHNOLOGY CO., LTD., Beijing (CN)

( * ) Notice: Subject to any disclaimer, the term of this patent is extended or adjusted under 35 U.S.C. 154(b) by 49 days.

(21) Appl. No.: 15/111,764

(22) PCT Filed: Aug. 13, 2014

(86) PCT No.: PCT/CN2014/084328
§ 371 (c)(1),
(2) Date: Jul. 14, 2016

(87) PCT Pub. No.: WO2015/106563
PCT Pub. Date: Jul. 23, 2015

(65) Prior Publication Data
US 2016/0335191 A1 Nov. 17, 2016

(30) Foreign Application Priority Data

Jan. 14, 2014 (CN) .......................... 2014 1 0016945

(51) Int. Cl.
*G06F 12/0891* (2016.01)
*G06F 11/34* (2006.01)
(Continued)

(52) U.S. Cl.
CPC ...... *G06F 12/0891* (2013.01); *G06F 11/3409* (2013.01); *G06F 16/172* (2019.01);
(Continued)

(58) Field of Classification Search
CPC ....................... G06F 2201/81; G06F 2212/171
See application file for complete search history.

(56) References Cited

U.S. PATENT DOCUMENTS

| 5,893,920 A | * | 4/1999 | Shaheen | G06F 12/0813 707/E17.01 |
|---|---|---|---|---|
| 2013/0173862 A1 | | 7/2013 | Lu et al. | |
| 2015/0081978 A1 | * | 3/2015 | Daly | G06F 12/0871 711/133 |
| 2015/0134913 A1 | * | 5/2015 | Huang | G06F 12/0833 711/135 |

FOREIGN PATENT DOCUMENTS

| CN | 103220427 A | 7/2013 |
|---|---|---|
| CN | 103324575 A | 9/2013 |

(Continued)

OTHER PUBLICATIONS

Translation of the International Search Report and Written Opinion corresponding to International Patent Application No. PCT/CN2014/084328, dated Nov. 18, 2014, 10 pages.

(Continued)

*Primary Examiner* — Tracy A Warren
(74) *Attorney, Agent, or Firm* — Lathrop Gage LLP

(57) ABSTRACT

The present disclosure provides a cache cleaning method, a cache cleaning apparatus and a client, which improves a cache cleaning efficiency in a client and improves a user experience effectively. The method includes: detecting an amount of used caches in a mobile terminal; if the amount of used caches is larger than a preset threshold, sending a cache application request to an operating system of the mobile terminal so as to trigger a preset cache release rule in the operating system; and after the operating system releases corresponding caches according to the preset cache release rule, sending a cache release request to the operating system such that the operating system releases caches allocated for the cache application request according to the (Continued)

cache release request. The present disclosure may be used in a cache management technique of a mobile terminal.

12 Claims, 3 Drawing Sheets

(51) Int. Cl.
*G06F 16/172* (2019.01)
*G06F 16/957* (2019.01)

(52) U.S. Cl.
CPC ...... *G06F 16/9574* (2019.01); *G06F 2201/81* (2013.01); *G06F 2201/885* (2013.01); *G06F 2212/1021* (2013.01); *G06F 2212/1024* (2013.01); *G06F 2212/171* (2013.01); *G06F 2212/604* (2013.01); *G06F 2212/608* (2013.01)

(56) References Cited

FOREIGN PATENT DOCUMENTS

| CN | 103677977 A | 3/2014 |
|---|---|---|
| CN | 103714016 A | 4/2014 |

OTHER PUBLICATIONS

Chinese Patent Application No. 201410016945.2 Second Office Action dated Aug. 16, 2016, 7 pages.
Chinese Patent Application No. 201410016945.2 English translation of Second Office Action dated Aug. 16, 2016, 8 pages.

\* cited by examiner

CACHE CLEANING METHOD AND APPARATUS, CLIENT

CROSS-REFERENCE TO RELATED APPLICATION

The present application is a U.S. national phase application of International Application No. PCT/CN2014/084328, filed with the State Intellectual Property Office of P. R. China on Aug. 13, 2014, which is based upon and claims priority to Chinese Patent Application No. 201410016945.2, filed on Jan. 14, 2014, the entirety contents of which are incorporated herein by reference.

TECHNICAL FIELD

The present disclosure generally relates to a mobile terminal field, and more particularly, to a cache cleaning method, a cache cleaning apparatus and a client.

BACKGROUND

With the development of mobile terminal technology, operating systems and application programs suitable for mobile terminals are updated constantly. In order to enhance an operational efficiency and fluency, many application programs use a lot of caches, resulting in a shortage of caches and thus degrading a user experience.

Currently, many operating systems support behaviors of the application programs in the background, such as a background suspending, a background running, etc. In this case, even if a user leaves an operation interface of the application program, caches occupied by this application program are not released, and the user must operate manually in a task manager to quit the application programs or reboot the terminal, such that too many caches occupied by the background programs may be released.

In the process of implementing the present disclosure, inventors have found that there are at least following problems in the related art. It is complicated and inefficient to quit the application program by the manual operation in the task manager or by rebooting the terminal. Moreover, many operating systems do not provide an interface for operating the caches directly, resulting in that the application program itself cannot realize a cache cleaning directly. In addition, although some application programs states that they can realize the cache cleaning function, they indeed display false data to the user and do not clear the cache at all, and thus the system is still running slowly and the user experience is still poor.

SUMMARY

Embodiments of the present disclosure seek to solve at least one of the problems existing in the related art.

Accordingly, a first objective of the present disclosure is to provide a cache cleaning method, which may clean too many caches occupied by background programs, thus improving an operational fluency of a mobile terminal, and enhancing a user experience effectively.

A second of the present disclosure is to provide a cache cleaning apparatus.

A third of the present disclosure is to provide a client.

A fourth of the present disclosure is to provide an application program.

A fifth of the present disclosure is to provide a storage medium.

In order to achieve above objectives, embodiments of a first aspect of the present disclosure provide a cache cleaning method, and the method includes: detecting an amount of used caches in a mobile terminal; if the amount of used caches is larger than a preset threshold, sending a cache application request to an operating system of the mobile terminal so as to trigger a preset cache release rule in the operating system; and after the operating system releases corresponding caches according to the preset cache release rule, sending a cache release request to the operating system, such that the operating system releases caches allocated for the cache application request according to the cache release request.

With the cache cleaning method according to embodiments of the present disclosure, when the amount of used caches is larger than the preset threshold, the cache release rule is triggered to release caches by applying for cache space, and then the operating system is requested to release caches allocated for the cache application request. In this way, a cache mechanism of the operating system of the terminal mobile may be used rationally and too many caches occupied by the background programs may be easily cleaned via interfaces provided by the operating system, thus improving an operational fluency of the mobile terminal and enhancing a user experience effectively.

In order to achieve above objectives, embodiment of a second aspect of the present disclosure provide a cache cleaning apparatus, and the apparatus includes: a detecting module, configured to detect an amount of used caches in a mobile terminal; a cache application module, configured to send a cache application request to an operating system of the mobile terminal so as to trigger a preset cache release rule in the operating system, if the amount of used caches is larger than a preset threshold; and a cache release module, configured to send a cache release request to the operating system after the operating system releases corresponding caches according to the preset cache release rule, such that the operating system releases caches allocated for the cache application request according to the cache release request.

With the cache cleaning apparatus according to embodiments of the present disclosure, when the amount of used caches is larger than the preset threshold, the cache release rule is triggered to release caches by applying for cache space, and then the operating system is requested to release caches allocated for the cache application request. In this way, a cache mechanism of the operating system of the terminal mobile may be used rationally and too many caches occupied by the background programs may be easily cleaned via interfaces provided by the operating system, thus improving an operational fluency of the mobile terminal and enhancing a user experience effectively.

In order to achieve above objectives, embodiments of a third aspect of the present disclosure provide a client, and the client includes a housing, a displayer, a circuit board and a processor, in which the circuit board is arranged inside a space enclosed by the housing, the displayer is arranged external to the housing and is connected with the circuit board, and the processor is arranged on the circuit board and is configured to process data. Specifically, the processor is configured to execute following steps of: detecting an amount of used caches in a mobile terminal; if the amount of used caches is larger than a preset threshold, sending a cache application request to an operating system of the mobile terminal so as to trigger a preset cache release rule in the operating system; and after the operating system releases corresponding caches according to the preset cache release rule, sending a cache release request to the operating system such that the operating system releases caches allocated for the cache application request according to the cache release request.

With the client according to embodiments of the present disclosure, when the amount of used caches is larger than the preset threshold, the cache release rule is triggered to release caches by applying for cache space, and then the operating system is requested to release caches allocated for the cache application request. In this way, a cache mechanism of the operating system of the terminal mobile may be used rationally and too many caches occupied by the background programs may be easily cleaned via interfaces provided by the operating system, thus improving an operational fluency of the mobile terminal and enhancing a user experience effectively.

In order to achieve above objectives, embodiments of a fourth aspect of the present disclosure provide an application program configured to perform a cache cleaning method according to embodiments of the first aspect of the present disclosure.

With the application program according to embodiments of the present disclosure, when the amount of used caches is larger than the preset threshold, the cache release rule is triggered to release caches by applying for cache space, and then the operating system is requested to release caches allocated for the cache application request. In this way, a cache mechanism of the operating system of the terminal mobile may be used rationally and too many caches occupied by the background programs may be easily cleaned via interfaces provided by the operating system, thus improving an operational fluency of the mobile terminal and enhancing a user experience effectively.

In order to achieve above objectives, embodiments of a fifth aspect of the present disclosure provide a storage medium including a computer program, in which the computer program is configured to perform a cache cleaning method according to embodiments of the first aspect of the present disclosure when running.

With the storage medium according to embodiments of the present disclosure, when the amount of used caches is larger than the preset threshold, the cache release rule is triggered to release caches by applying for cache space, and then the operating system is requested to release caches allocated for the cache application request. In this way, a cache mechanism of the operating system of the terminal mobile may be used rationally and too many caches occupied by the background programs may be easily cleaned via interfaces provided by the operating system, thus improving an operational fluency of the mobile terminal and enhancing a user experience effectively.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
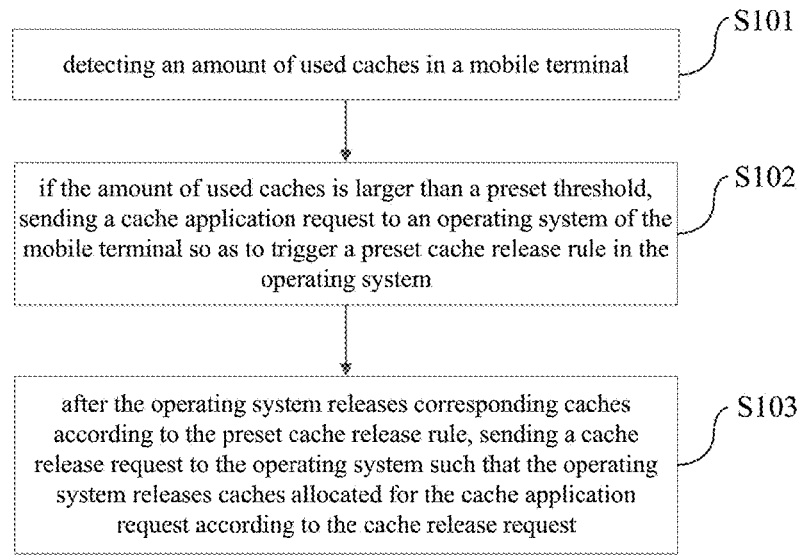
FIG. 1 is a flow chart illustrating a cache cleaning method according to an embodiment of the present disclosure.

Reference will be made in detail to embodiments of the present disclosure, wherein the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

In the description of the present disclosure, it should be understood that, unless specified or limited otherwise, the terms "installed," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure as defined by the claims.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

A cache cleaning method, a cache cleaning apparatus and a client according to embodiments of the present disclosure will be described below with reference to accompanying drawings.

In order to solve the problem that the mobile terminal runs slowly due to an inefficient cache cleaning, the present disclosure provides a cache cleaning method.

FIG. 1 is a flow chart illustrating a cache cleaning method according to an embodiment of the present disclosure. As shown in FIG. 1, the cache cleaning method includes following steps.

In step 101, an amount of used caches in a mobile terminal is detected.

Specifically, the amount of used caches is detected by an application program of the mobile terminal via a programming interface provided by an operating system or via a specific detection module. As show in FIG. 2, a cache usage detecting result interface is illustrated, in which the detecting result includes an amount of available memory (caches), an amount of used memory (caches) and a rate of the used caches to total caches. The application program of the mobile terminal may be an application program configured to detect and clean the caches, for example, a cache cleaner of the mobile terminal, a mobile phone housekeeper, or any other application program capable of detecting and cleaning caches.

In step 102, if the amount of used caches is larger than a preset threshold, a cache application request is sent to the operating system of the mobile terminal so as to trigger a preset cache release rule in the operating system.

Specifically, according to the detecting result of the amount of used caches, it is determined whether the amount of used caches is larger than the preset threshold. The preset threshold may be a preset proportional of the total caches, which may be set according to specific operation situations of the mobile terminal.

If the amount of used caches is larger than the preset threshold, the cache application request is sent to the operating system of the mobile terminal by the application program. The cache application request may include a size of required caches, and may be sent to the operating system via a cache application interface provided by the operating system. The caches may be allocated by the operating system according to the cache application request, which results in reducing the available caches, thus triggering the preset cache release rule in the operating system.

The preset cache release rule may be set by developers in advance according to different operating system. During the operation of the mobile terminal, whenever the preset cache release rule is triggered, for example, when there are not sufficient free caches to support the normal operation of the mobile terminal, a preset cache releasing behavior may be implemented automatically and a certain amount of corresponding caches may be released according to a preset priority.

Currently, there are various kinds of operating systems of the mobile terminals, for example, IOS operating system (developed by Apple Inc. for handheld devices), Android operating system (with free and open source codes and based on Linux), Windows Phone operating system (developed by Microsoft Inc. for mobile terminals), and so on.

Specifically, taking the IOS operating system as an example, according to the principle of the IOS operating system, any data objects applied for in the application programs may use the caches, and the operating system allocates the caches according to the cache application request and sends an address of allocated caches to the corresponding application program, and the allocated caches will be occupied by the corresponding application program until the corresponding application program is released manually or forcibly. Taking the IOS operating system as an example, the IOS operating system is a system which is completely object-oriented, and any user-visible presentation is based on objects, in which, the objects may be basic entities in the process of program implementation, for example, views, lists, pictures, etc. The IOS operating system provides several programming interfaces for the application programs to apply for the caches: for a standard NSObject class of object (the NSObject class is a basic class of the IOS operating system and all classes in the IOS operating system are based on characteristics of this class), the interface such as an alloc interface and a malloc interface may be required to apply for the caches; if the picture is used in the application program, it needs to use imageNamed interface to apply for the caches such that the picture data may be held; for network related operations, such as opening webpages, requesting data and the like, the operating system provides NSURLCache class (a cache class for network request data) for applying for caches via setMemoryCapacity interface (configured to set a cache size) to store network data. The alloc interface, malloc interface, imageNamed interface and setMemoryCapacity interface are programming interfaces provided by the IOS operating system for the application programs, in which the alloc interfaces and malloc interface are common interfaces for allocating the caches, and the NSObject and NSURLCache are class names commonly used in the IOS operating system.

In step 103, after the operating system releases corresponding caches according to the preset cache release rule, a cache release request is sent to the operating system such that the operating system releases caches allocated for the cache application request according to the cache release request.

Specifically, after a certain amount of caches is released by the operating system according to the preset cache release rule, the cache release request is sent to the operating system via an interface provided by the operating system so as to request the operating system to release the caches allocated for the cache application request.

With the cache cleaning method according to embodiments of the present disclosure, when the amount of used caches is larger than the preset threshold, the cache release rule is triggered to release caches by applying for cache space, and then the operating system is requested to release caches allocated for the cache application request. In this way, a cache mechanism of the operating system of the terminal mobile may be used rationally and too many caches occupied by the background programs may be easily cleaned via interfaces provided by the operating system, thus improving an operational fluency of the mobile terminal and enhancing a user experience effectively.

Figure 3:
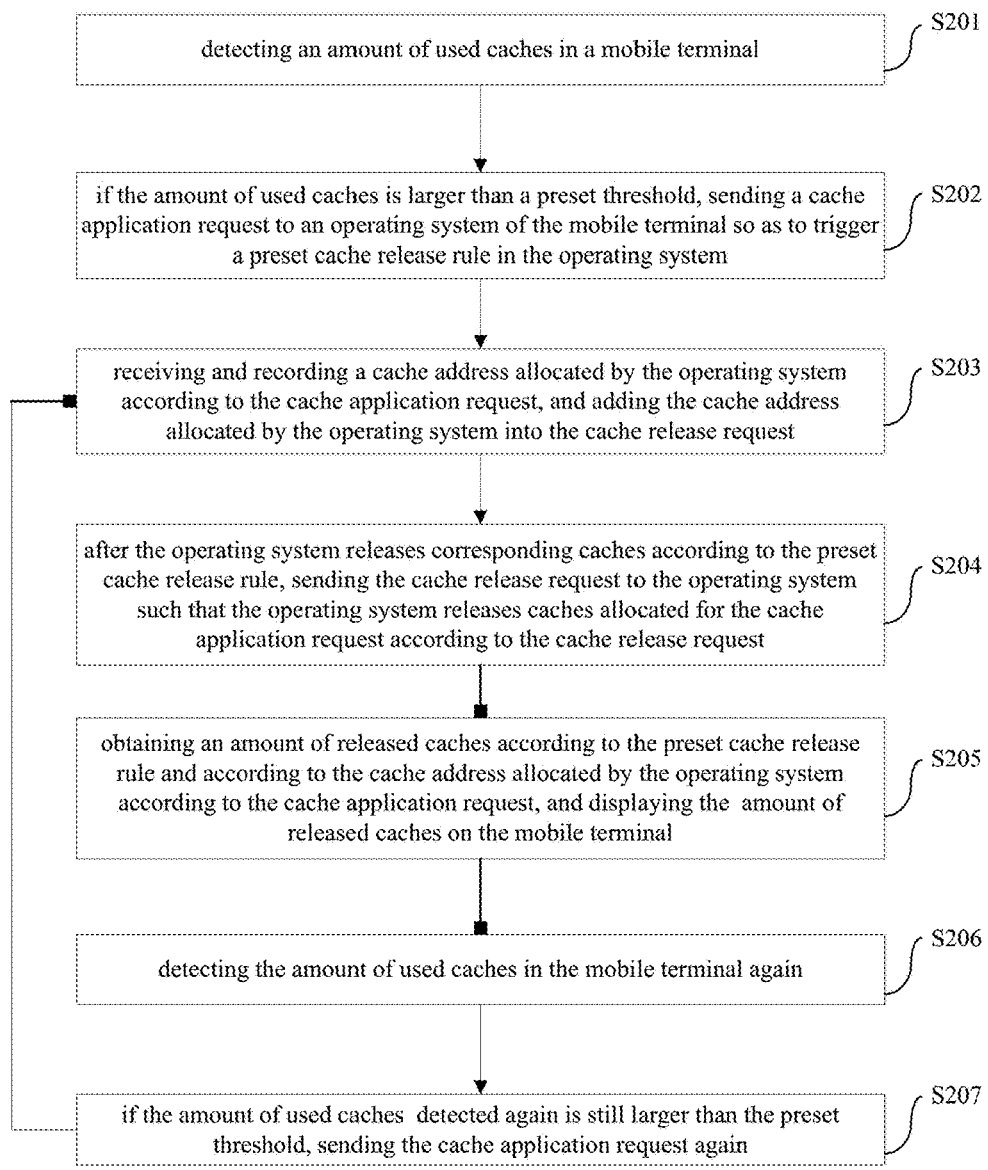
FIG. 3 is a flow chart illustrating a cache cleaning method according to another embodiment of the present disclosure.

FIG. 3 is a flow chart illustrating a cache cleaning method according to another embodiment. In order to optimize the cache cleaning of the mobile terminal, in embodiments of the present disclosure, a preset amount of caches occupied by a background running program may be released first according to the cache release rule, and then the caches allocated according to the cache application request may be requested to be released. As shown in FIG. 3, the cache cleaning method includes following steps.

In step 201, an amount of used caches in a mobile terminal is detected.

In step 202, if the amount of used caches is larger than a preset threshold, a cache application request is sent to the operating system of the mobile terminal so as to trigger a preset cache release rule in the operating system.

The preset cache release rule includes releasing by the operating system the preset amount of used caches occupied by the background running program. During the operation of the mobile terminal, whenever the preset cache release rule is satisfied, the operating system will release the preset number of caches occupied by the background running program. For example, if the amount of used caches is larger than the preset threshold (for example 90%), a cache alert is generated in the mobile terminal and a certain amount of caches is released automatically. It should be understood that, the mobile terminal will process the caches occupied by the background running programs preferentially, in which each segment of caches is identified with a cache address.

It should be note that, in order to trigger the preset cache release rule in the operating system, it needs to set a size of caches applied for by the cache application request according to the detected amount of used caches, so as to ensure that the preset threshold in the preset cache release rule is reached, thus triggering the operating system to clean the caches.

In step 203, a cache address allocated by the operating system according to the cache application request is received and recorded, and the cache address allocated by the operating system is added into the cache release request.

The cache release request contains a number of caches to be released, and also specifies the address of caches to be released. When the caches is applied for, the operating system will allocate the cache address according to the cache application request and return a start address of a segment of consecutive caches. At this time, the available caches are reduced, which triggers the preset cache release rule, thus making the operating system release the caches occupied by the background running program.

In step 204, after the operating system releases corresponding caches according to the preset cache release rule, a cache release request is sent to the operating system such that the operating system releases caches allocated for the cache application request according to the cache release request.

Specifically, after a certain amount of caches is released by the operating system according to the preset cache release rule, the cache release request is sent to the operating system via an interface provided by the operating system, and thus the operating system may release all caches allocated for the cache application request and set the corresponding cache address and caches space to be available.

In step 205, an amount of released caches is obtained according to the preset cache release rule and according to the cache address allocated by the operating system according to the cache application request, and the amount of released caches is displayed on the mobile terminal.

It should be understood that, both the caches space released according to the preset cache release rule and the caches space allocated by the operating system according to the cache application request belong to the caches released in this cleaning operation. However, the amount of released caches displayed on the mobile terminal may include a total amount of the two kinds of released caches, or may only include the amount of caches released according to the preset cache release rule.

In step 206, the amount of used caches in the mobile terminal is detected again.

In step 207, if the amount of used caches in the mobile terminal detected again is still larger than the preset threshold, the cache application request is sent again.

Specifically, after one cleaning operation, it may detect again whether the amount of used caches in the mobile terminal is larger than the preset threshold, and if the amount of used caches in the detecting result is still larger than the preset threshold, the cache application request is sent again to trigger the preset cache release rule, and then a second cleaning operation is started, refer to steps S202~S205.

With the cache cleaning method according to embodiments of the present disclosure, when the amount of used caches is larger than the present threshold, by applying for cache space, the preset cache release rule may be triggered to release caches occupied by the background running program preferentially, and then the caches space allocated according to the cache application request is released, and above steps are repeated until the amount of used caches does not exceed the preset threshold, such that too many caches occupied by the background programs are easily cleaned, thus improving an operational fluency of the mobile terminal and improving a user experience effectively.

In order to realize the above-described embodiments, the preset disclosure also provides a cache cleaning apparatus.

Figure 4:
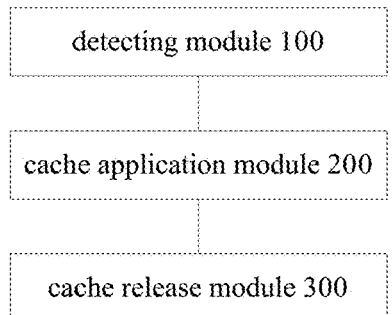
FIG. 4 is a block diagram illustrating a cache cleaning apparatus according to an embodiment of the present disclosure.

FIG. 4 is a block diagram illustrating a cache cleaning apparatus according to an embodiment of the preset disclosure. As shown in FIG. 4, the apparatus includes a detecting module 100, a cache application module 200 and a cache release module 300.

Specifically, the detecting module 100 is configured to detect an amount of used caches in a mobile terminal. More specifically, the detecting module 100 may detect the amount of used caches via a programming interface provided by an operating system. As show in FIG. 2, a cache usage detecting result interface is illustrated, in which the detecting result includes an amount of available memory (caches), an amount of used memory (caches) and a rate of the used caches to a total caches.

The cache application module 200 is configured to send a cache application request to an operating system of the mobile terminal so as to trigger a preset cache release rule in the operating system, if the amount of used caches is larger than a preset threshold. More specifically, according to the detecting result of the amount of used caches, it is determined whether the amount of used caches is larger than the preset threshold. The preset threshold may be a preset proportional of the total caches, which may be set according to a specific operation situation of the mobile terminal. If the amount of used caches is larger than the preset threshold, the cache application request is sent to the operating system of the mobile terminal by the cache application module 200. The cache application request may include a size of required caches, and may be sent to the operating system via a cache application interface provided by the operating system. The operating system allocates caches according to the cache application request, resulting in a reduction of the available caches and thus triggering the preset cache release rule in the operating system. The preset cache release rule includes releasing by the operating system releases the preset amount of caches occupied by the background running program. During the operation of the mobile terminal, whenever the preset cache release rule is satisfied, the operating system will release the preset amount of caches occupied by the background running program. For example, if the amount of used caches is larger than the preset threshold (for example 90%), a cache alert is generated in the mobile terminal and a certain amount of caches is released automatically. It should be understood that, the mobile terminal will process the caches occupied by the background running program preferentially, in which each segment of caches is identified with a cache address.

Currently, there are various kinds of operating systems of the mobile terminals, for example, IOS operating system (developed by Apple Inc. for handheld devices), Android operating system (with free and open source codes and based on Linux), Windows Phone operating system (developed by Microsoft Inc. for the mobile terminals), and so on. More specifically, taking the IOS operating system as an example, according to the principle of the IOS operating system, any data objects applied for in the application programs may use the caches, and the operating system allocates the caches according to the cache application request and sends an address of allocated caches to the corresponding application program, and the allocated caches will be occupied by the corresponding application program until the corresponding application program is released manually or forcibly. Taking the IOS operating system as an example, the IOS operating system is a system which is completely object-oriented, and any user-visible representation is based on objects, in which, the objects may be basic entities in the process of program implementation, for example, views, lists, pictures, etc. The IOS operating system provides several programming interfaces for the application programs to apply for the caches: for a standard NSObject class of object (the NSObject class is a basic class of the IOS operating system and all classes in the IOS operating system are based on characteristics of this class), the interface such as an alloc interface and a malloc interface may be required to apply for the caches; if the picture is used in the application program, it needs to use imageNamed interface to apply for the caches such that the picture data may be held; for network related operations, such as opening webpages, requesting data and the like, the operating system provides NSURLCache class (a cache class for network request data) for applying for caches for via setMemoryCapacity interface (configured to set a cache size) to store network data. The alloc interface, malloc interface, imageNamed interface and setMemoryCapacity interface are programming interfaces provided by the IOS operating system for the application programs, in which the alloc interfaces and malloc interface are common interfaces for allocating the caches and the NSObject and NSURLCache are class names commonly used in the IOS operating system.

The cache release module 300 is configured to send a cache release request to the operating system such that the operating system releases caches allocated for the cache application request according to the cache release request, after the operating system releases corresponding caches according to the preset cache release rule. More specifically, after a certain amount of caches is released by the operating system according to the preset cache release rule, the cache release request is sent to the operating system by the cache release module 300 via an interface provided by the operating system so as to request the operating system to release the caches allocated for the cache application request.

With the cache cleaning apparatus according to embodiments of the present disclosure, when the amount of used caches is larger than the preset threshold, the cache release rule is triggered to release caches by applying for cache space, and then the operating system is requested to release caches allocated for the cache application request. In this way, a cache mechanism of the operating system of the terminal mobile may be used rationally and too many caches occupied by the background programs may be easily cleaned via interfaces provided by the operating system, thus improving an operational fluency of the mobile terminal and enhancing a user experience effectively.

Figure 5:
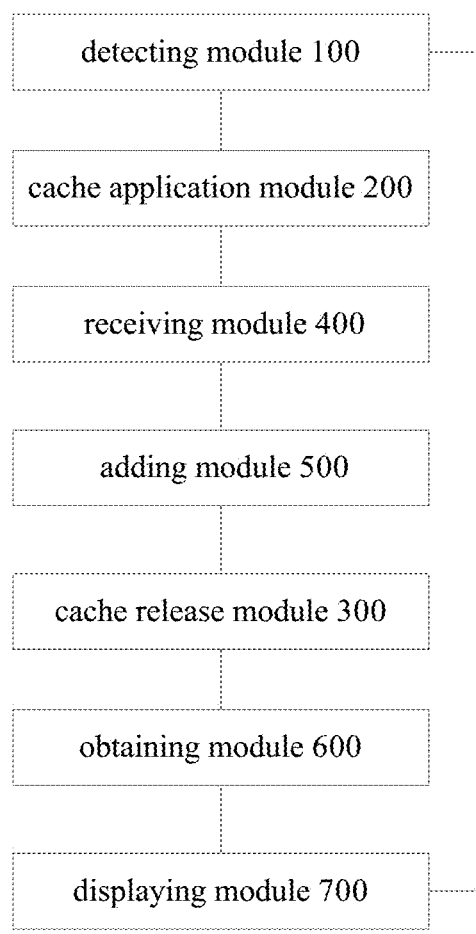
FIG. 5 is a block diagram illustrating a cache cleaning apparatus according to another embodiment of the present disclosure.

FIG. 5 is a block diagram illustrating a cache cleaning apparatus according to another embodiment of the preset disclosure. As shown in FIG. 5, the apparatus includes a detecting module 100, a cache application module 200, a cache release module 300, a receiving module 400, an adding module 500, an obtaining module 600 and a displaying module 700.

Specifically, the receiving module 400 is configured to receive and record a cache address allocated by the operating system according to the cache application request. More specifically, when the caches is applied for, the operating system will allocate the cache address according to the cache application request, and the receiving module 400 receives and records a start address of the cache space returned by the operating system. At this time, the available caches are reduced, which triggers the preset cache release rule, thus making the operating system release the caches occupied by the background running program.

The adding module 500 is configured to add the cache address allocated by the operating system into the cache release request. The cache release request contains a number of caches to be released, and also specifies the address of caches to be released. More specifically, the adding module 500 is configured to add the cache address allocated by the operating system according to the cache application request, and received and recorded by the receiving module 400 into the cache release request.

The obtaining module 600 is configured to obtain an amount of released caches according to the preset cache release rule and according to the cache address allocated by the operating system according to the cache application request.

The displaying module 700 is configured to display the amount of released caches on the mobile terminal.

It should be understood that, both the caches space released according to the preset cache release rule and the caches space allocated by the operating system according to the cache application request belong to the caches released in this cleaning operation. However, the amount of released caches displayed on the mobile terminal may include a total amount of the two kinds of released caches, or may only include an amount of caches released according to the preset cache release rule.

The detecting module 100 is further configured to detect the amount of used caches in the mobile terminal again.

The cache application module 200 is further configured to send the cache application request again if the amount of used caches detected again is still larger than the preset threshold.

More specifically, after one cleaning operation, the detecting module 100 detects again whether the amount of used caches in the mobile terminal is larger than the preset threshold, and if the amount of used caches in the detecting result is still larger than the preset threshold, the cache application module 200 sends the cache application request sent again to trigger the preset cache release rule, and then a second cleaning operation is started.

With the cache cleaning apparatus according to embodiments of the present disclosure, when the amount of used caches is larger than the present threshold, by applying for cache space, the preset cache release rule may be triggered to release caches occupied by the background running program preferentially, and then the caches space allocated according to the cache application request is released, and above steps are repeated until the amount of used caches does not exceed the preset threshold, such that too many caches occupied by the background programs are easily cleaned, thus improving an operational fluency of the mobile terminal and improving a user experience effectively.

In order to realize the above-described embodiments, the present disclosure also provides a client.

The client according to embodiments of the present disclosure includes: a housing, a displayer, a circuit board and a processor, in which the circuit board is arranged inside a space enclosed by the housing, the displayer is arranged external to the housing and is connected with the circuit board, and the processor is arranged on the circuit board and configured to process data so as to execute following steps.

In step 101', an amount of used caches in a mobile terminal is detected.

Figure 2:
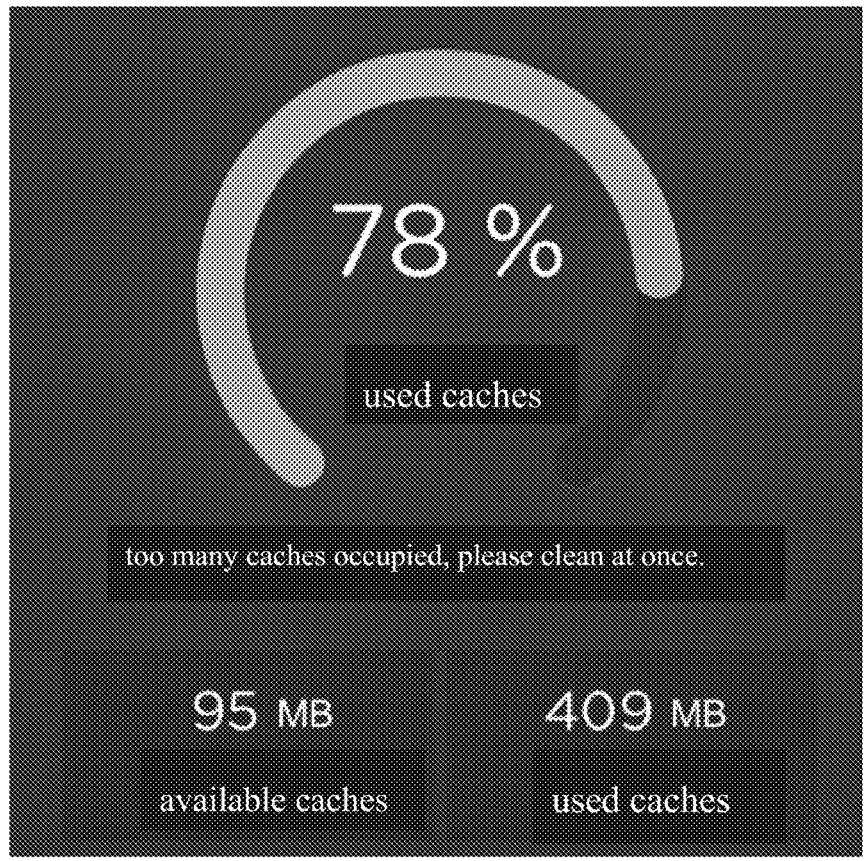
FIG. 2 is a schematic diagram illustrating a cache usage detecting result interface according to an embodiment of the present disclosure.

Specifically, the processor may detect the amount of used caches via a programming interface provided by an operating system or a specific detection module. As shown in FIG. 2, a cache usage detecting result interface is illustrated, in which the detecting result includes an amount of available memory (caches), an amount of used memory (caches) and a rate of the used caches to a total caches.

In step 102', if the amount of used caches is larger than a preset threshold, a cache application request is sent to the operating system of the mobile terminal so as to trigger a preset cache release rule in the operating system.

Specifically, according to the detecting result of the amount of used caches, the processor determines whether the amount of used caches is larger than the preset threshold. The preset threshold may be a preset proportional of the total caches, which may be set according to a specific operation situation of the mobile terminal.

If the amount of used caches is larger than the preset threshold, the processor may send the cache application request to the operating system of the mobile terminal via the application. The cache application request may include a size of required caches, and may be sent to the operating system via a cache application interface provided by the operating system. The operating system allocates caches according to the cache application request, resulting in a reduction of the available caches and thus triggering the preset cache release rule in the operating system.

The preset cache release rule may be set by developer in advance according to different operating system. During the operation of the mobile terminal, whenever the preset cache release rule is triggered, for example, when there are not sufficient free caches to support the normal operation of the mobile terminal, a preset cache releasing behavior may be implemented automatically and a certain amount of corresponding caches may be released according to a preset priority.

Currently, there are various kinds of operating systems of the mobile terminals, for example, IOS operating system (developed by Apple Inc. for handheld devices), Android operating system (with free and open source codes and based on Linux), Windows Phone operating system (developed by Microsoft Inc. for the mobile terminals), and so on. Specifically, taking the IOS operating system as an example, according to the principle of the IOS operating system, any data objects applied for in the application programs may use the caches, and the operating system allocates the caches according to the cache application request and sends an address of allocated caches to the corresponding application program, and the allocated caches will be occupied by the corresponding application program until the corresponding application program is released manually or forcibly. Taking the IOS operating system as an example, the IOS operating system is a system which is completely object-oriented, and any user-visible presentation is based on objects, in which, the objects may be basic entities in the process of program implementation, for example, views, lists, pictures, etc. The IOS operating system provides several programming interfaces for the application programs to apply for the caches: for a standard NSObject class of object (the NSObject class is a basic class of the IOS operating system and all classes in the IOS operating system are based on characteristics of this class), the interface such as an alloc interface and a malloc interface may be required to apply for the caches; if the picture is used in the application program, it needs to use imageNamed interface to apply for the caches, such that the picture data may be held; for network related operations, such as opening webpages, requesting data and the like, the operating system provides NSURLCache class (a cache class for network request data) for applying for caches via setMemoryCapacity interface (configured to set a cache size) to store network data. The alloc interface, malloc interface, imageNamed interface and setMemoryCapacity interface are programming interfaces provided by the IOS operating system for the application programs, in which the alloc interfaces and malloc interface are common interfaces for allocating the caches and the NSObject and NSURLCache are class names commonly used in the IOS operating system.

In step 103', after the operating system releases corresponding caches according to the preset cache release rule, a cache release request is sent to the operating system such that the operating system releases caches allocated for the cache application request according to the cache release request.

Specifically, after a certain amount of caches is released by the operating system according to the preset cache release rule, the cache release request is sent to the operating system via an interface provided by the operating system so as to request the operating system to release the caches allocated for the cache application request.

With the client according to embodiments of the present disclosure, when the amount of used caches is larger than the preset threshold, the cache release rule is triggered to release caches by applying for cache space, and then the operating system is requested to release caches allocated for the cache application request. In this way, a cache mechanism of the operating system of the terminal mobile may be used rationally and too many caches occupied by the background programs may be easily cleaned via interfaces provided by the operating system, thus improving an operational fluency of the mobile terminal and enhancing a user experience effectively.

In an embodiment, the processor is further configured to execute following steps.

In step 201', an amount of used caches in a mobile terminal is detected.

In step 202', if the amount of used caches is larger than a preset threshold, a cache application request is sent to the operating system of the mobile terminal so as to trigger a preset cache release rule in the operating system.

The preset cache release rule includes releasing by the operating system the preset amount of used caches occupied by the background running program. During the operation of the mobile terminal, whenever the preset cache release rule is satisfied, the operating system will release the preset number of caches occupied by the background running program. For example, if the amount of used caches is larger than the preset threshold (for example 90%), a cache alert is generated in the mobile terminal and a certain amount of caches is released automatically. It should be understood that, the mobile terminal will process the caches occupied by the background running program preferentially, in which each segment of caches is identified with a cache address.

It should be note that, in order to trigger the preset cache release rule in the operating system, it needs to set a size of caches applied for by the cache application request according to the detected amount of used caches, so as to ensure that the preset threshold in the preset cache release rule is reached, thus triggering the operating system to clean the caches.

In step 203', a cache address allocated by the operating system according to the cache application request is received and recorded, and the cache address allocated by the operating system is added into the cache release request.

The cache release request contains an amount of caches to be released, and also specifies the address of caches to be released. When the caches is applied for, the operating system will allocate the cache address according to the cache application request and return a start address of a segment of consecutive caches. At this time, the available caches are reduced, which triggers the preset cache release rule, thus making the operating system release the caches occupied by the background running program.

In step 204', after the operating system releases corresponding caches according to the preset cache release rule, a cache release request is sent to the operating system such that the operating system releases caches allocated for the cache application request according to the cache release request.

Specifically, after a certain amount of caches is released by the operating system according to the preset cache release rule, the cache release request is sent to the operating system by the processor via an interface provided by the operating system, and thud the operating system may release all caches allocated for the cache application request and set the corresponding cache address and caches space to be available.

In step 205', an amount of released caches is obtained according to the preset cache release rule and according to the cache address allocated by the operating system according to the cache application request, and the amount of released caches is displayed on the mobile terminal.

It should be understood that, both the caches space released according to the preset cache release rule and the caches space allocated by the operating system according to the cache application request belong to the caches released in this cleaning operation. However, the amount of released caches displayed on the mobile terminal may include a total amount of the two kinds of released caches, or may only include an amount of caches released according to the preset cache release rule.

In step 206', the amount of used caches in the mobile terminal is detected again.

In step 207', if the amount of used caches detected again is still larger than the preset threshold, the cache application request is sent again.

Specifically, after one cleaning operation, it is detected again whether the amount of used caches in the mobile terminal is larger than the preset threshold, and if the amount of used caches in the detecting result is still larger than the preset threshold, the cache application request is sent again to trigger the preset cache release rule, and then a second cleaning operation is started, refer to steps S202'~S205'.

With the client according to embodiments of the present disclosure, when the amount of used caches is larger than the present threshold, by applying for cache space, the preset cache release rule may be triggered to release caches occupied by the background running program preferentially, and then the caches space allocated according to the cache application request is released, and above steps are repeated until the amount of used caches does not exceed the preset threshold, such that too many caches occupied by the background programs are easily cleaned, thus improving an operational fluency of the mobile terminal and improving a user experience effectively.

In order to realize the above-described embodiments, the preset disclosure also provides an application program. The application program is configured to perform a cache cleaning method according to the above-described embodiments of the present disclosure.

With the application program according to embodiments of the present disclosure, when the amount of used caches is larger than the preset threshold, the cache release rule is triggered to release caches by applying for cache space, and then the operating system is requested to release caches allocated for the cache application request. In this way, a cache mechanism of the operating system of the terminal mobile may be used rationally and too many caches occupied by the background programs may be easily cleaned via interfaces provided by the operating system, thus improving an operational fluency of the mobile terminal and enhancing a user experience effectively.

In order to realize the above-described embodiments, the preset disclosure also provides a storage medium. The storage medium includes a computer program, in which the computer program is configured to perform a cache cleaning method according to the above-described embodiments of the present disclosure when running.

With the storage medium according to embodiments of the present disclosure, when the amount of used caches is larger than the preset threshold, the cache release rule is triggered to release caches by applying for cache space, and then the operating system is requested to release caches allocated for the cache application request. In this way, a cache mechanism of the operating system of the terminal mobile may be used rationally and too many caches occupied by the background programs may be easily cleaned via interfaces provided by the operating system, thus improving an operational fluency of the mobile terminal and enhancing a user experience effectively.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A cache cleaning method, comprising:
   detecting, via an application program on a mobile terminal, an amount of used caches in the mobile terminal;
   when the amount of used caches is larger than a preset threshold, sending a cache application request from the application to an operating system of the mobile terminal so as to trigger a preset cache release rule in the operating system, wherein the cache application request comprises a number of required caches determined based on the detected amount of used caches; and
   receiving, by the application, at least one cache address allocated by the operating system according to the cache application request; and,
   after receiving the at least one cache address, sending a cache release request to the operating system such that the operating system releases caches allocated for the cache application request according to the cache release request, the cache release request including the at least one cache address.

2. The method according to claim 1, wherein the preset cache release rule comprises releasing by the operating system a preset amount of caches occupied by a background running program.

3. The method according to claim 1, after sending a cache release request to the operating system, further comprising:
   detecting the amount of used caches in the mobile terminal again; and
   when the amount of used caches detected again is still larger than the preset threshold, sending a second cache application request.

4. The method according to claim 1, after sending a cache release request to the operating system, further comprising:
   obtaining an amount of released caches according to the preset cache release rule and according to the at least one cache address allocated by the operating system, and displaying the amount of released caches on the mobile terminal.

5. A client, comprising a housing, a displayer, a circuit board and a processor, wherein the circuit board is arranged inside a space enclosed by the housing, the displayer is arranged external to the housing and connected with the circuit board, and the processor is arranged on the circuit board and configured to execute an application and thereby process data so as to execute following steps of:
   detecting, via the application, an amount of used caches in a mobile terminal;
   when the amount of used caches is larger than a preset threshold, sending, via the application, a cache application request to an operating system of the mobile terminal so as to trigger a preset cache release rule in the operating system, wherein the cache application request comprises a number of required caches determined based on the detected amount of used caches; and
   receiving, by the application, at least one cache address allocated by the operating system according to the cache application request; and,
   after receiving the at least one cache address, sending a cache release request to the operating system after the operating system such that the operating system releases caches allocated for the cache application request according to the cache release request, the cache release request including the at least one cache address.

6. The client according to claim 5, wherein the preset cache release rule comprises releasing by the operating system a preset amount of caches occupied by a background running program.

7. The client according to claim 5, wherein the processor is further configured to execute following steps of:
  detecting the amount of used caches in the mobile terminal again; and
  when the amount of used caches detected again is still larger than the preset threshold, sending a second cache application request.

8. The client according to claim 5, wherein the processor is further configured to execute following steps of:
  obtaining an amount of released caches according to the preset cache release rule and according to the at least one cache address allocated by the operating system, and displaying the amount of released caches on the mobile terminal.

9. A non-transitory computer readable medium storing instructions that, when run, perform following steps:
  detecting an amount of used caches in a mobile terminal;
  when the amount of used caches is larger than a preset threshold, sending a cache application request to an operating system of the mobile terminal so as to trigger a preset cache release rule in the operating system, wherein the cache application request comprises a number of required caches determined based on the detected amount of used caches;
  receiving at least one cache address allocated by the operating system according to the cache application request; and,
  after receiving the at least one cache address, sending a cache release request to the operating system such that the operating system releases caches allocated for the cache application request according to the cache release request, the cache release request including the at least one cache address.

10. The non-transitory computer readable medium according to claim 9, wherein the preset cache release rule comprises releasing by the operating system a preset amount of caches occupied by a background running program.

11. The non-transitory computer readable medium according to claim 9, the instructions further performing following steps of:
  detecting the amount of used caches in the mobile terminal again; and
  when the amount of used caches detected again is still larger than the preset threshold, sending a second cache application request.

12. The non-transitory computer readable medium according to claim 9, the instructions further performing following steps of:
  obtaining an amount of released caches according to the preset cache release rule and according to the cache address allocated by the operating system, and displaying the amount of released caches on the mobile terminal.

* * * * *